(12) United States Patent
Nishimura et al.

(10) Patent No.: US 7,889,186 B2
(45) Date of Patent: Feb. 15, 2011

(54) PEN INPUT DEVICE AND METHOD FOR TRACKING PEN POSITION

(75) Inventors: Ken A. Nishimura, Fremont, CA (US); Ian Hardcastle, Sunnyvale, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1168 days.

(21) Appl. No.: 11/118,691

(22) Filed: Apr. 29, 2005

(65) Prior Publication Data
US 2006/0244738 A1 Nov. 2, 2006

(51) Int. Cl.
*G09G 5/00* (2006.01)
(52) U.S. Cl. ............... 345/179; 345/156; 345/173; 345/182
(58) Field of Classification Search ......... 345/173–184, 345/165–166, 156–158; 178/19.01–19.05; 382/314
See application file for complete search history.

(56) References Cited

U.S. PATENT DOCUMENTS

| | | | |
|---|---|---|---|
| 6,151,015 A | 11/2000 | Badyal et al. | |
| 6,256,016 B1 * | 7/2001 | Piot et al. | 345/166 |
| 6,650,320 B1 | 11/2003 | Zimmerman | |
| 7,342,575 B1 * | 3/2008 | Hartwell et al. | 345/179 |
| 2005/0174324 A1 * | 8/2005 | Liberty et al. | 345/156 |

* cited by examiner

*Primary Examiner*—Alexander Eisen
*Assistant Examiner*—Christopher E Leiby (57) ABSTRACT

The pen input device has both a movement detection system and a position detection system that collectively track the position of the pen input device during a writing operation on a writing surface. The pen input device has a writing tip capable of performing a writing operation in contact with the writing surface. A controller is operable to activate the movement detection system continuously during the writing operation and to activate the position detection system intermittently during the writing operation. The movement detection system is operable to determine movement data that represent changes between successive positions of the writing tip. The position detection system is operable to determine position data that represents a position of the writing tip on the writing surface.

23 Claims, 5 Drawing Sheets

PEN INPUT DEVICE AND METHOD FOR TRACKING PEN POSITION

BACKGROUND OF THE INVENTION

Recently, pen input devices have become available that electronically capture pen strokes on a surface (hereinafter referred to as "writing operations") by sensing the time-dependent position of the pen on the surface and converting the pen positions to writing operations. However, traditional incremental movement detection techniques, such as those used in optical mice, fail when the pen input device is lifted off of the surface. Therefore, position detection techniques have been developed to determine the actual location (position) of the pen input device on the surface.

One position detection technique uses paper pre-treated with optically recognizable fiducials that allow the pen input device to determine its position relative to the fiducials. For example, as described in U.S. Pat. No. 6,650,320, a laser mounted on a digital pen input device directs coherent light towards special bar-coded paper. The reflected interference patterns are imaged and processed to determine the position of the pen input device relative to the known bar code patterns. However, requiring special paper increases the cost and limits the usage of such pen input devices.

Another position detection technique uses passive optical fiducials to determine the position of the pen input device. Typically, the pen input device is provided with wide field of view optics (e.g., panoramic optics) that enable an image of the surroundings of the pen input device to be taken. As long as a sufficient portion of the paper and its surroundings (e.g., three edges of the paper) are visible in the image, the position of the pen input device, along with the orientation of the pen input, can be computed. As writing operations are performed, the information written on the paper during the writing operations serve as additional fiducials.

However, the image processing involved in determining the position of the pen input device using passive optical fiducials is complex and computationally intensive. Additionally, frame rates in excess of 100 Hz are required to track the movement of the pen input device. In addition, some of the movement of the pen input device can be attributed to involuntary movements of the user's hand that result in no significant movement of the writing tip of the pen input device. Performing complex computations merely to determine that no significant movement occurred at the writing tip of the pen is inefficient and undesirable, especially for wireless, battery-powered pen input devices.

Some position detection techniques use the edges of the paper as references with respect to which the position of the pen input device is determined. However, under some circumstances, there may not be enough optical contrast between a blank sheet of paper and the background to enable the position of the pen input device to be reliably determined.

Therefore, what is needed is a technique for determining the path of a pen input device on a writing surface with reduced computational complexity and that does not require special paper.

SUMMARY OF THE INVENTION

Embodiments of the present invention provide a pen input device including both a movement detection system and a position detection system that collectively track the position of the pen input device during a writing operation on a writing surface. The pen input device has a writing tip capable of performing a writing operation in contact with the writing surface. A controller is operable to activate the movement detection system continuously during the writing operation and to activate the position detection system intermittently during the writing operation. The movement detection system is operable to determine movement data that represent changes between successive positions of the writing tip. The position detection system is operable to determine position data that represents a position of the writing tip on the writing surface.

In one embodiment, the movement detection system includes a movement optical image sensor and transfer optics. The movement optical image sensor is for capturing successive movement images in response to light returned from the writing surface and for producing movement image data representing the successive movement images. The image transfer optics transfer the light from the writing surface to the movement optical image sensor. The position detection system includes a position optical image sensor and image transfer optics. The position optical image sensor is for capturing a position image in response to light returned from the writing surface and for producing position image data representing the position image. The image transfer optics transfer the light from the writing surface to the position optical image sensor.

Non-optical movement detection systems are also possible.

In another aspect, the invention provides a method for capturing the position of the writing tip of a pen input device on a writing surface during a writing operation. The method comprises determining movement data while the writing tip contacts the writing surface during the writing operation; determining position data at least once during the writing operation; and linking the position data with the movement data. The movement data represents changes between successive positions of the writing tip on the writing surface. The position data represents a position of the writing tip on the writing surface.

In a final aspect, the invention provides a method for determining the position of the writing tip of a pen input device on a writing surface during writing operations. The method comprises determining movement data representing changes between successive positions of the writing tip during at least two of the writing operations and determining position data representing a position of the writing tip on the writing surface using marks made on the writing surface by the at least two of the writing operations as positional references.

Considerable savings in computation complexity and power consumption are achieved by using movement detection instead of position detection during each writing operation. In addition, the precision with which the position detection system need operate are reduced, resulting in further reductions in cost and complexity.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION

Activities that will be referred to in this disclosure as writing and that encompass writing, printing, drawing, etc., involve a user making strokes with a pen input device on a writing surface. During each stroke, the pen input device contacts the writing surface and typically makes a mark thereon. The process of making a stroke during the activity of writing will be called a writing operation. Additionally, at the end of each stroke, the user performs a repositioning operation in which the user moves the pen input device so that it no longer contacts the writing surface and, with the pen input device out of contact with the writing surface, re-positions the pen input device to the beginning of the next stroke. The user then moves the pen input device into contact with the paper to make the next stroke.

Most systems of writing are based on characters composed of one or more strokes. Examples of the word character as used in this disclosure are a single letter of the Roman alphabet, a word or part of a word written in the Roman alphabet using cursive writing and one kanji of a kanji-based writing system such as Chinese or Japanese. Determining the relative positions of the strokes constituting a character is desirable to enable the character to be accurately captured for reproduction on a screen or to enable the character to be reliably recognized by character recognition.

Figure 1:
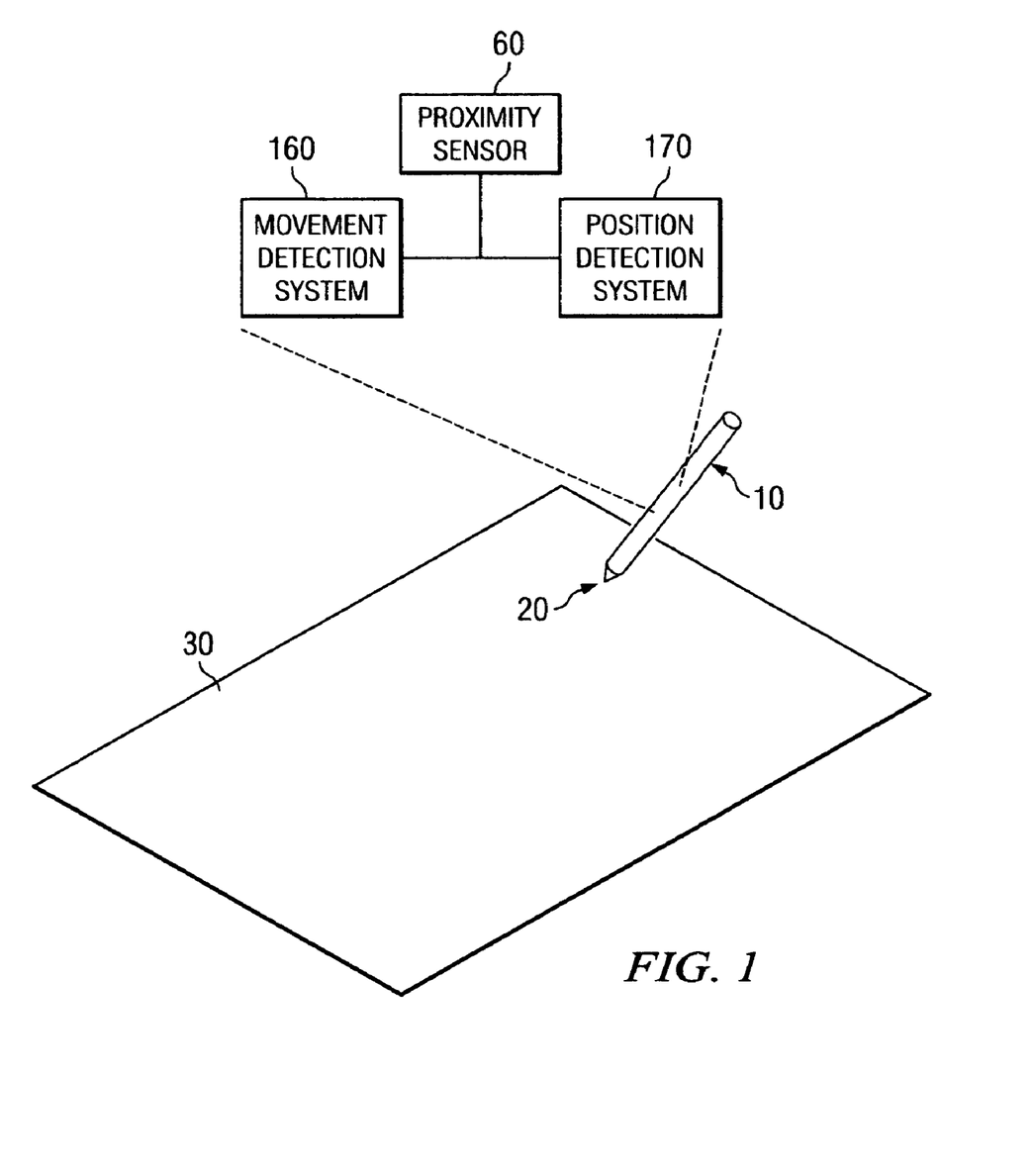
FIG. 1 is a block diagram illustrating exemplary components of a pen input device, in accordance with embodiments of the present invention.

FIG. 1 illustrates an exemplary pen input device 10 in accordance with embodiments of the invention. Pen input device 10 has a writing tip 20 that a user moves relative to a writing surface 30 by manipulating the pen input device. Typically, the writing tip is capable of making visible marks on the writing surface 30. However, some embodiments do not require the writing tip to make visible or otherwise optically detectable marks on the writing surface.

Pen input device incorporates a proximity sensor 60, a movement detection system 160 and a position detection system 170. The proximity sensor determines whether the writing tip 20 of the pen input device is in contact with the writing surface 30. The movement detection system 160 incorporates a simple, low power movement detector that operates while the proximity detector 60 indicates that the writing tip 20 is in contact with the writing surface 30 to detect the movement of the writing tip 20 relative to the writing surface 30. Hence, the movement detection system 160 detects the shape of each stroke.

In some embodiments, the movement detector is similar to that of an optical mouse. Other embodiments employ other types of movement detectors.

The position detection system 170 operates intermittently during each writing operation to make a determination of the position of the writing tip 20 on the writing surface 30. The position detection system 170 typically operates once at the beginning of each writing operation when the proximity detector 60 indicates that the user has moved the writing tip 20 into contact with the writing surface 30 at the beginning of the stroke to determine the position of the writing tip at the beginning of the writing operation. The position detection system 170 may additionally operate when the proximity detector 60 indicates that the user has moved the writing tip 20 out of contact with the writing surface 30 at the end of each stroke to determine the position of the writing tip 20 on the writing surface 30 at the end of the writing operation. From positions of the writing tip 20 on the writing surface 30 determined at the beginning and optionally, the end of each writing operation, the position detection system determines the relative positions of the strokes and the orientations of the strokes on the writing surface 30. This allows the strokes to be assembled into characters for display on a screen or for recognition by a handwriting recognition system.

The position detection system 170 is more complex and consumes more power than the movement detection system 160 but is only activated intermittently. As noted above, the position detection system is typically activated to make a single position determination at the beginning and end of each writing operation. Consequently, the average power consumption of the position detection is relatively low notwithstanding its greater instantaneous power consumption. A further reduction in power consumption is obtained by activating the movement detection system 160 only when the proximity detector 60 indicates that the writing tip 20 is in contact with the writing surface 30.

The writing surface 30 can be any type of flat surface on which a user of the pen input device 10 can write (e.g., paper, wood, laminate, painted surface, etc.) and is not limited to any particular type of special surface. In embodiments other than those described below with reference to FIGS. 5-7, in which visible marks made on the writing surface are used as positional references, the writing tip 20 need not leave a visible mark on the writing surface.

The movement detection system 160 acquires a series of low resolution, narrow view images of the surface 30 during each writing operation. An image acquired by the movement detection system 160 will be called a movement image. In response to the movement images, the movement detection system 160 produces movement image data 202 from which changes between successive positions of the writing tip 20 on the writing surface 30 are determined during each writing operation. The movement detection system typically detects changes between the position of the writing tip in successive movement images.

The position detection system 170 typically acquires no more than one high resolution, wide view image of the writing surface 30 at the beginning of each writing operation and another high resolution, wide view image of the writing surface 30 at the end of each writing operation. An image acquired by the position detection system 170 will be called a position image. In response to each position image, the position detection system produces position image data from which a respective position of the writing tip 20 on the writing surface 30 is determined.

Thus, the position detection system 170 is used mainly for determining the positions and orientations of the strokes on the writing surface, while the movement detection system 160 is used to capture the shape of the stroke made during each writing operation.

As noted above, the proximity sensor 60 detects whether the writing tip 20 of the pen input device 10 is in contact with the writing surface 30. It should be noted that the term "in contact with" as used in this disclosure encompasses the writing tip 20 touching the writing surface 30 and the writing tip 20 being within a defined proximity of the writing surface 30. The proximity sensor 60 provides a proximity signal whose state indicates whether the writing tip 20 is in contact with the writing surface 30. In the examples described below, the state of the proximity signal indicating that the writing tip is in contact with the writing surface 30 will be called the contact state and the other state of the proximity signal will be called the non-contact state. However, the proximity signal is not limited to this example.

The proximity signal is used to activate the movement detection system 160 and the position detection system 170. For example, in one embodiment, a change in the state of the proximity signal from contact to non-contact, indicating that user has moved the writing tip 20 out of contact with the writing surface 30, deactivates the movement detection system 160 to reduce power consumption and momentarily activates the position detection system 170 to determine the position of the writing tip 20 on the writing surface 30 at the end of the writing operation.

In another embodiment, a change in the state of the proximity signal from non-contact to contact, indicating that the user has moved the writing tip 20 into contact with the writing surface 30, momentarily activates the position detection system 170 to capture a position image of the writing surface 30, and activates the movement detection system 160 to capture a series of movement images to detect movement of the writing tip 20 on the writing surface 30 while the writing tip remains in contact with the writing surface. Movement image data derived from the series of movement images captured by the movement detection system 160 during the writing operation is used to determine movement data representing changes between successive positions of the writing tip 20 on the surface 30 during the writing operation. The movement data is used to determine the magnitude of the movement of the writing tip 20 in two orthogonal directions ($\Delta x$, $\Delta y$) between successive ones of the movement images. Thus, the movement data for a particular writing operation includes multiple sets of incremental movement data ($\Delta x$, $\Delta y$), one set for each movement image acquired during the writing operation. The sets of incremental movement data are concatenated to describe the movement of the writing tip 20 across the surface 30 from the original position of the writing tip 20 at the beginning of the writing operation.

For example, in one embodiment, the movement data for a particular writing operation includes data points each of which quantifies the incremental movement ($\Delta x$, $\Delta y$; or $\Delta r$, $\Delta \theta$) of the writing tip 20 relative to the writing surface 30 between successive movement images.

Position image data produced by the position detection system 170 is used to determine position data that represents the position of the writing tip 20 of the pen input device 10 on the writing surface 30 at the beginning and the end of each stroke written by a respective writing operation. For example, in an exemplary embodiment, when the proximity signal changes from non-contact to contact, indicating that the user has moved the writing tip 20 into contact with the writing surface 30, the position detection system 170 is momentarily activated to generate position data defining the position of the writing tip 20 on the writing surface 30 at the beginning of the stroke. This change in the proximity signal additionally causes the movement detection system 160 to acquire a first one of the successive movement images. Thus, when the proximity signal changes state from non-contact to contact, the position detection system 170 acquires a position image to determine the position of the writing tip 20 on the writing surface 30 when the writing tip 20 initially contacts the writing surface 30 at the beginning of the stroke. Additionally, during the writing operation that follows the initial contact, the movement detection system 160 acquires the series of movement images used to determine the movement of the writing tip 20 relative to the writing surface 30 while the writing tip 20 is in contact with the writing surface 30 writing the stroke. Additionally, when the proximity signal changes state from contact to non-contact at the end of each stroke, the movement detection system 160 is deactivated, and the position detection system 170 is momentarily activated to acquire a second position image from which the position detection system determines the position of the writing tip 20 on the writing surface 30 at the end of the stroke.

Thus, the position detection system 170 operates intermittently, typically acquiring and processing a single image at the beginning of each stroke and acquiring and processing a single image at the end of the stroke. Thus, the effective frame rate of the position detection system is greatly reduced compared with a conventional position detection system. The position detection system 170 need not finish its determination of the position of the writing tip 20 on the writing surface 30 before the user begins to write the stroke: the determination processing can continue as the stroke is being written. As a result, the position detection system processes the position image data at a frame rate commensurate with the average frequency with which the state of the writing tip 20 changes from contact to non-contact. Thus, the time available for the position detection system to perform the relatively complex computational operation of processing the position image data to determine the position of the writing tip 20 on the writing surface 30 substantially greater than that available in a conventional position detection system. This results in a significant saving in power.

Figure 2:
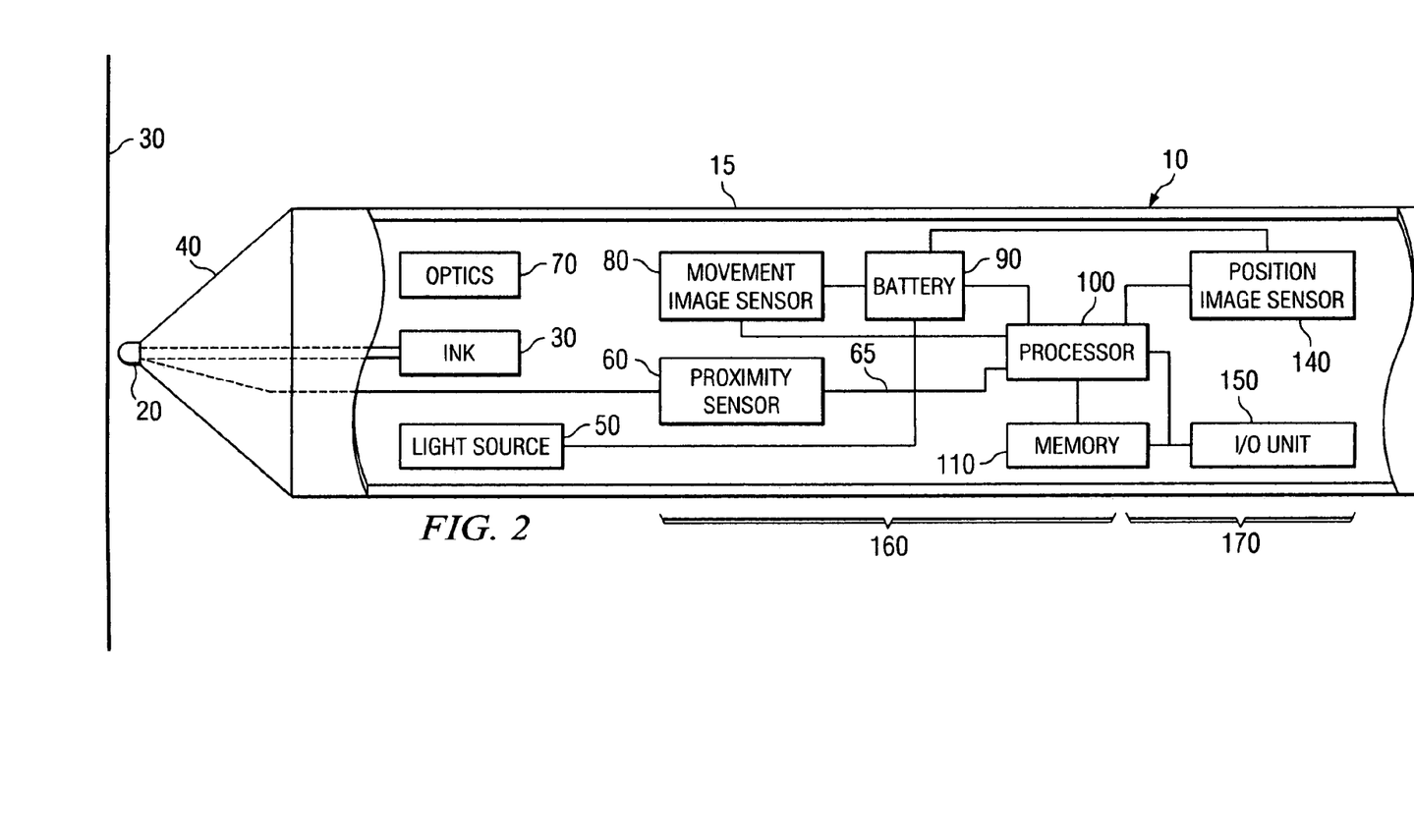
FIG. 2 is a simplified and magnified pictorial side view of the pen input device, in accordance with embodiments of the present invention.

FIG. 2 shows a more detailed view of the pen input device 10 in accordance with embodiments of the present invention. The pen input device 10 has an elongate hollow body 15. The pen body 15 includes a tapered portion 40 extending to the writing tip 20 at one end of the pen body 15. The tapered portion 40 is translucent to allow light to enter and exit the pen body 15. For example, the tapered portion 40 may be formed of glass, plastic or other material that is transparent to light. The elongate shape of the pen body 15 is designed to enable a user to manipulate the pen body 15 to deposit ink 30, graphite or other substance onto a writing surface during a writing operation. However, in embodiments that do not use marks made on the writing surface by the writing operation as positional references, as will be described in more detail below, or that otherwise do not rely on such marks, the pen input device 10 can be a stylus-type device that does not deposit ink or other substance onto the writing surface.

The pen input device 10 also includes a light source 50 located in the pen body 15 for illuminating the writing surface 30 through the tapered portion 40 of the pen body 15. The light source 50 can be any suitable source of electromagnetic radiation, e.g., infrared or visible light. By way of example, but not limitation, the light source 50 can be a single light emitting diode (LED), multiple LEDs arranged to illuminate different portions of the writing surface 30 or an array of LEDs designed to emit light at a desired average intensity.

The wavelength of light emitted by the light source 50 is typically selected to maximize the intensity of the light returned from the writing surface 30 and to enable the light returned from the writing surface to be distinguished from unwanted light signals. In addition, the wavelength of the light can be chosen based on user or manufacturer preferences. For example, some manufacturers may prefer blue light to red light in certain applications. The light source 50 can be in an "on state" in a continuous mode with either a steady or variable illumination intensity. Alternatively, the light source 50 may be operated in a duty-cycle mode, where the light source 50 is pulsed on and off to control the average light intensity returned from the writing surface. The intensity of illumination can be controlled using any known technique.

In embodiments in which the movement detection system 160 and the position detection system 170 are sensitive enough to operate using ambient light, the light source 50 may be omitted. In embodiments in which only the position detection system 170 needs artificial light, the light source 50 may be momentarily activated while the position detection system 170 is acquiring a position image.

Image transfer optics 70 within the pen input device directs light returned from the writing surface onto arrays of photo detectors that constitute a movement optical image sensor 80 and a position optical image sensor 140. The movement optical image sensor 80 is part of the movement detection system 160, and the position optical image sensor 140 is part of the position detection system 170. The image transfer optics 70 include one or more optical systems for directing light returned from the writing surface 30 towards the image sensors 80 and 140. For example, the image transfer optics 70 can include a narrow-angle lens for directing the returned light towards the movement optical image sensor 80 and a wide-angle lens for directing the returned light towards the position optical image sensor 140. The image sensors 80 and 140 can be located in the same region of the pen input device 10 or in different regions of the pen input device 10. For example, the narrow-angle lens and movement optical image sensor 80 can be located near the writing tip 20 of the pen input device 10, whereas the wide-angle lens and position optical image sensor 140 can be located on the side or the top of the pen input device 10, remote from the writing tip 20. In addition, in other embodiments, one or more light-guiding devices, e.g., fiber optics, can be included in the pen input device 10 to guide one or both of the illumination light from the light source 50 to the writing surface and the light returned from the writing surface to the optical image sensor 80 or 140.

Both the movement optical image sensor 80 and the position optical image sensor 140 can be a CCD (Charge Coupled Device), a CMOS—APS (Complimentary Metal Oxide Semiconductor—Active Pixel Sensor) or any other type of light sensor. Optical image sensors 80 and 140 have advantages over thermal or capacitive image sensors due to the magnification/demagnification mechanisms that can be used with optical image sensors to reduce the silicon area. Thermal and capacitive image sensors typically require the silicon area to be equivalent in size to the sensing area. In addition, capacitive image sensors can be susceptible to electrostatic discharge, which can decrease the signal-to-noise ratio, and thus degrade the image.

The movement optical image sensor 80 acquires a series of movement images of the writing surface, and derives from each movement image movement image data representing the movement image. The movement image data includes the intensity of the returned light measured at each photo detector of the movement optical image sensor 80 for each movement image. Each photo detector captures one picture element (pixel) of the movement image. Each photo detector has a photo sensitive region, with the spacing between the photo-detectors designed to achieve the desired spatial resolution of the sensor 80. The photo detectors can be, for example, photodiodes or phototransistors arranged in an array. The size of the array is dependent upon the magnification of the optics. For example, magnifications less than unity, near unity or above unity can be used, depending on the size constraints of the tapered portion 40 of the pen body 15 and the manufacturer's preferences.

The movement optical image sensor 80 provides movement image data (e.g., raw pixel values) for each of the movement images to a processor 100 located in the pen body 15. The processor 100 processes the movement image data to determine movement data quantifying the incremental change in the position of the writing tip 20 on the writing surface 30 between successive movement images during each writing operation performed by the pen input device 10, as will be described in more detail below with reference to FIG. 3. The processor 100 can include any microprocessor, microcontroller, digital signal processor, programmable logic device or other type of processing device capable of performing the functions described herein. In addition, the processor 100 can include multiple processors or can be a single general-purpose processor capable of executing a number of algorithms. In addition, in other embodiments, at least a portion of the processor 100 is incorporated in the same chip as the movement image sensor 80.

The movement data representing the changes between successive positions of the writing tip 20 on the writing surface 30 during each writing operation can be stored in a memory 110 for later processing and/or can be output to an external device via I/O unit 150. The I/O unit 150 can provide a direct wired connection to an external device, a networked connection to a remote device or a wireless connection to an external and/or remote device. For example, the movement data can be transferred to a handwriting recognition application executing on a personal computer for converting the movement data to alpha-numeric characters and graphical representations.

The memory 110 is a memory device, such as random access memory (RAM), flash memory, or any other type of storage device. Additional processing information (not shown) can also be stored on the memory 110 and accessed by the processor 100. For example, such processing information can include various processing parameters, such as algorithms that can be used to process the movement image data and determine the movement data from the movement image data.

The position optical image sensor 140 acquires a wide view position image of the writing surface surrounding the pen input device 10, and derives from the position image position image data representing the position image. The position image data represents the intensity of the light measured at each photo detector of the position optical image sensor 140, as discussed above. Each photo detector captures one picture element (pixel) of the image. The photo detectors can be, for example, photodiodes or phototransistors arranged in an array. The resolution of the position optical image sensor 140 is typically higher than the resolution of the movement optical image sensor 80 to enable the position detection system to determine the position of the writing tip 20 on the writing surface 30 with sufficient precision. In addition, the number of photo detectors in the position optical image sensor 140 is typically substantially greater than the number of photo detectors in the movement optical image sensor 80.

The position optical image sensor 140 provides position image data, e.g., raw pixel values, to the processor 100. The processor 100 processes the position image data and determines the position of the writing tip 20 of the pen input device 10 on the writing surface typically at the beginning and the end of each writing operation, as will be described in more detail below with reference to FIG. 3. In other embodiments, at least a portion of the processor 100 is incorporated in the same chip as the position image sensor 140. The position data representing the position of the writing tip 20 on the writing surface can also be stored in the memory 110 for later processing and/or output to an external device via the I/O unit 150.

The proximity sensor 60, which can be embodied as a switch located in the pen body 15, detects whether the writing tip 20 of the pen input device 10 is in contact with the writing surface 30, as described above with reference to FIG. 1. The proximity sensor 60 provides a proximity signal to the processor 100 via a control line 65. As described above, the state of the proximity signal indicates whether the writing tip 20 is in contact with the writing surface. The processor 100 responds to a change in the state of the proximity signal received on control line 65 to activate the movement detection system 160 and the position detection system 170. When the state of the proximity signal changes from contact to non-contact, indicating that the user has moved the writing tip 20 away from contact with the writing surface, in one embodiment, the processor 100 deactivates the movement detection system 160 to save power, and momentarily activates the position detection system 170 to determine the position of the writing tip on the writing surface 30 at the end of the stroke.

The proximity sensor 60, and other parts of the pen input device 10 (e.g., processor 100, light source 50 and sensors 80 and 140) are powered by an internal power supply 90. In an embodiment, the power supply 90 comprises one or more rechargeable or non-rechargeable batteries. In other embodiments, power is supplied to the pen input device 10 via the I/O unit 150 from an external device, e.g., a computer. In embodiments in which the power supply 90 includes one or more rechargeable or non-rechargeable batteries contained within the pen body 15, providing a power saving mode when the writing tip 20 is not in contact with the writing surface extends battery life.

Figure 3:
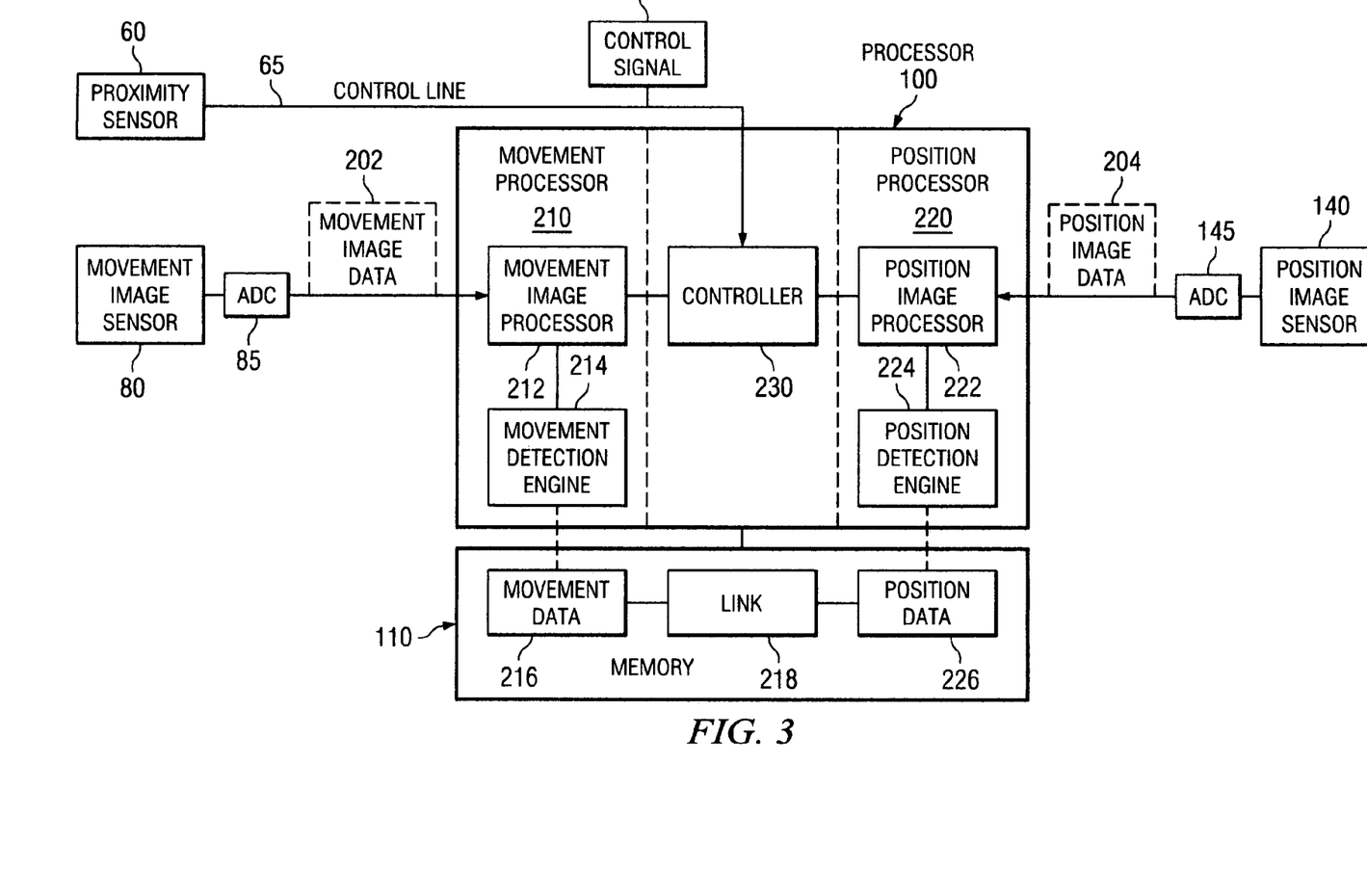
FIG. 3 is a block diagram illustrating exemplary hardware and processing components of the pen input device, in accordance with one embodiment of the present invention.

FIG. 3 is a block diagram illustrating the hardware and processing components of an exemplary embodiment of the pen input device 10 in accordance with the invention. As described above with reference to FIG. 2, the pen input device 10 includes a movement optical image sensor 80 and a position optical image sensor 140, each for capturing images formed thereon and for generating respective image signals representing the images. The image signals are converted to corresponding image data by respective analog-to-digital converters (ADCs) 85 and 145. For example, the ADCs 85 and 145 can be six-bit, eight-bit or ten-bit ADCs operating at a rate ranging from approximately 25 frames/sec to in excess of 1,000 frames/sec. Alternatively, one ADC (not shown) with suitable switching can be used instead of analog-to-digital conversion system 85 and 145.

Movement image data 202 representing the series of movement images is output from the ADC 85 to the processor 100, and position image data 204 representing each position image output from the ADC 145 is input to the processor 100. The processor 100 includes a movement processor 210 for receiving the movement image data 202 and a position processor 230 for receiving the position image data 204. In one embodiment, the movement image data 202 is received by a movement image processor 212 within the movement processor 210. The movement image processor 212 processes the movement image data 202 and outputs processed movement image data in a form that enables the incremental changes in position of the writing tip 20 on the writing surface during each writing operation to be determined efficiently.

For example, in an embodiment in which the movement image sensor 80 is a color sensor incorporating a color filter array, the movement image processor 212 demosaics the image. Demosaicing is a process by which missing color values for each pixel location are interpolated from neighboring pixels. A number of demosaicing methods are known in the art; for example, pixel replication, bilinear interpolation and median interpolation. Other processing that the movement image processor 212 can perform includes noise filtering, image enhancement and extraction of features that are of interest.

In embodiments in which the movement image data is first processed by the movement image processor 212, the processed movement image data is provided to a movement detection engine 214 within the movement processor 210. In other embodiments, the unprocessed movement image data, e.g., raw pixel values, is input directly to the movement detection engine 214. The movement detection engine 214 determines movement data 216 defining the changes between successive positions of the writing tip 20 on the writing surface 30 from the successive movement images captured during the writing operation. The movement data 216 is stored in the memory 110 for subsequent processing or is output to another application, e.g., a handwriting recognition application. A number of different processes are known that can be used by the movement detection engine 214 to determine the movement data 216.

For example, as described in U.S. Pat. No. 6,172,354, entitled Operator Input Device, incremental movement is quantified by cross correlating a pattern in a previous movement image with the same pattern in a current movement image. Circular harmonics are used to determine movement of the current movement image relative to the previous movement image to provide rotationally-invariant incremental information. Another method for determining movement data 216 is described in U.S. Pat. No. 6,195,475, entitled Navigation System for Handheld Scanner. U.S. Pat. No. 6,195,475 models the correlation surface of correlation data representing a relationship between a sample frame and a reference frame as a general two-dimensional Taylor series expansion to quantify the magnitude and direction of displacement of a reference feature contained in both the reference frame and the sample frame.

A further movement detection process is taught in U.S. Pat. No. 5,578,813, entitled Freehand Image Scanning Device Which Compensates for Non-Linear Movement. The movement detection process described in U.S. Pat. No. 5,578,813 correlates successive frames of image data by comparing the successive frames. For example, as taught in U.S. Pat. No. 5,578,813, a reference frame and current frame of image data are acquired. The entire content of one of the frames (reference or current) is shifted in multiple trial shifts, in which each trial shift shifts each pixel in the frame in one of multiple directions. For example, the shifts may be in nine different directions, i.e., a "null" shift, a shift to the right, a shift to the right and down, etc.).

For each trial shift, those portions of the frames that overlap each other are subtracted on a pixel by pixel basis, and the resulting differences are typically squared and then summed to form a measure of similarity (correlation figure of merit) within that region of overlap. In addition, a correlation figure of merit for a "null" shift is also computed for the case where no movement has occurred between frames.

The shifting is accomplished by using address offsets for memories that can output an entire row or column of an array at one time. Dedicated arithmetic circuitry is connected to the memory array that contains the frame being shifted and to the memory array that contains the other frame to formulate the correlation figures of merit for each trial shift. Pixel locations along unmatched edges between the shifted frame and other frame are excluded when calculating the corresponding correlation figures of merit. The trial shift with the least difference (lowest correlation figure of merit) indicates the direction of movement between the two frames. The magnitude of movement in this example is one pixel unless the "null" shift has the lowest correlation figure of merit, in which case the magnitude of movement is zero.

The identity of the trial shift with the lowest correlation figure of merit provides the directional component of movement data 216. The magnitude component of the movement data 216 is zero or one pixel, as described above. The current frame is then used as the reference frame for the next acquired image or the initial reference frame can be re-used to determine the incremental movement of successive current frames. In order to re-use the initial reference frame, the movement data (direction and displacement data) for the most recent frame is maintained for subsequent shifting and correlation figure of merit computation operations. Each shifting operation effectively throws away some of the reference frame, reducing the size of the reference frame and degrading the statistical quality of the correlation figures of merit. A new reference frame is taken when an edge of the shifted and reduced initial reference frame begins to approach the center of what was the original reference frame.

In other embodiments, fractional trial shifts equal to a fraction of the distance between adjacent pixels are used in addition to or in lieu of the whole pixel trial shifts described above. In addition, larger trial shifts are also possible. For example, in other modes of operation, the frame rates may be lower, requiring larger trial shifts to quantify the magnitude and direction of movement. However, the complexity of computing the correlation figures of merit increases as the trial shift amount increases.

The position image data 204 is received by a position image processor 222 or a position detection engine 224 within the position processor 220. The position image processor 222 processes the position image data 204 and outputs processed position image data in a form that enables the position of the writing tip 20 on the writing surface 30 to be determined efficiently. For example, such image processing can include demosaicing, noise filtering, image enhancement and extraction of features (e.g., passive optical fiducials, such as previously-written strokes, on the writing surface) that are of interest.

In embodiments in which the position image data 204 is first processed by the position image processor 222, the processed position image data is then provided to the position detection engine 224 within the position processor 220. In other embodiments, the unprocessed position image data (e.g., raw pixel values) is input directly to the position detection engine 224. The position detection engine 224 determines position data 226 representing the position of the writing tip 20 on the writing surface 30 typically at the beginning and the end of each writing operation. The position data 226 is stored in the memory 110 for subsequent processing or is output to another application (e.g., a character recognition application). For example, in one embodiment, the position detection engine 224 uses passive optical fiducials, such as the edges of the writing surface, as positional references with respect to which it calculates the position of the writing tip 20 on the writing surface. The position detection engine typically determines the positions of the writing surface at the beginning of each writing operation and at the end of the writing operation. The position detection engine may make additional determinations of the position of the writing tip one or more times during each writing operation, although this is not usually necessary and consumes power. The movement detection engine 214 and position detection engine 224 each include hardware, software and/or firmware capable of performing the functions described above. Software and/or firmware based embodiments can be programmed using any type of programming technique, including object oriented programming.

The processor 100 additionally includes a controller 230 connected the control line 65 to receive the proximity signal 205 from the proximity sensor 60. The state of the proximity signal 205 indicates to the processor 100 whether the writing tip is in contact with the writing surface. For example, in one embodiment, when the proximity sensor 60 detects that the user has moved the writing tip 20 into contact with the writing surface, indicating the beginning of a writing operation, the proximity signal 205 goes high, and when the proximity sensor detects that the user has moved the writing tip 20 out of contact with the writing surface, indicating the end of the writing operation, the proximity signal 205 goes low. As noted above, the proximity sensor 60 detects whether either the writing tip 20 is touching the writing surface 30 or is within a defined proximity of the writing surface. In an embodiment in which the proximity sensor detects whether the writing tip 20 is within a defined proximity of the writing surface 30, the proximity sensor may detect whether the writing tip 20 is close enough to the writing surface for the movement detection system 160 to determine movement of the writing tip relative to the writing surface.

The controller 230 controls the activation of the movement detection system 160 and the position detection system 170 based on the state of the proximity signal 205. For example, in one embodiment, when the proximity signal 205 goes low, indicating that the state of the writing tip 20 has changed from contact to non-contact, the controller 230 deactivates the movement processor 210 and momentarily activates the position processor 220 to process a position image of the writing surface captured at the end of the writing operation. In addition, the controller 230 can additionally turn off the light source 50 (shown in FIG. 1) when the proximity signal 205 goes low, and can to turn on the light source when the proximity signal 205 goes high to further reduce power consumption.

In another embodiment, when the proximity signal 205 first goes high, indicating that the user has moved the writing tip 20 into contact with the writing surface 30 and a writing operation has begun, the controller 230 activates the position detection system 170 to obtain typically a single position image of the writing surface 30 to determine the position of the writing tip 20 on the writing surface. In addition, the controller 230 also activates the movement detection system 160 to obtain successive movement images from which the movement of the writing tip 20 is determined while the proximity signal 205 remains high, i.e., during the writing operation.

In one embodiment, the position data 226 is used to determine the position of the writing tip 20 on the writing surface at the beginning of each writing operation, i.e., when the movement detection system acquires the first of the series of movement images. The position image enables the position of the pen writing tip 20 on the writing surface 30 at the beginning of the writing operation, i.e., at the beginning of the stroke, to be determined. Thereafter, the movement data 216 is used to determine the magnitude and direction of movement ($\Delta x$, $\Delta y$) (e.g., the incremental changes in the position of the writing tip of the pen input device) between successive movement images acquired during the writing operation.

Movement detection is used to capture the movement of the writing tip 20 during each writing operation using a simple, inexpensive and low-power motion detector. However, as noted above, movement detection does not effectively capture the movement of the writing tip between strokes when the writing tip is out of contact with the writing surface. Thus, position detection is momentarily used to determine the position of the beginning of each stroke written on the writing surface to allow characters to be assembled with the strokes correctly positioned relative to one another. However, as a result of using movement detection in addition to position detection, the precision of the position detection system can be less than that of existing position detection systems, resulting in reductions in the cost and complexity of the position detection system. In addition, since the computational complexity needed to perform movement detection is orders of magnitude less than that required for position detection, using movement detection in lieu of full-time position detection while the writing tip is in contact with the writing surface results in considerable savings in both computation and power consumption.

The movement data provided by the movement detection system 160 is typically not absolute movement data, i.e., the movement represented by the movement data is not defined in a coordinate system that is fixed relative to the writing surface 30. Instead, the movement data is relative movement data that depends on the orientation of the pen input device 10 relative to the edges of the writing surface 30 and the rotational orientation of the pen input device about its lengthways axis. Relative movement data does not define the orientation of the strokes relative to a fixed coordinate system. Variations in the orientation of the pen input device relative to the writing surface produce corresponding variations in the orientation of the strokes. To define the orientations of the strokes relative to a fixed coordinate system, two or more position detection operations are performed during each writing operation. For example, position detection operations are performed at the beginning and at the end of each writing operation, as described above.

In embodiments in which the movement data is absolute movement data or in embodiments which the relative movement data is converted into absolute movement data, no more than one position determination operation need be performed during each writing operation.

The controller 230 provides a link 218 that is used to associate the movement data 216 obtained during each writing operation performed by the pen input device (e.g., while the proximity signal 205 remains high) with the position data 226 for the writing operation. The link 218 is used by a subsequent application (e.g., a character recognition application) to link the position data 226 with the movement data 216 so that the subsequent application can assemble the strokes written by the user during successive writing operations to form characters that can be displayed on a screen or recognized by a character recognition application.

In assembling the characters, for example, the subsequent application locates the beginning of each stroke, as represented by the movement data, at the position of the beginning of the stroke indicated by the position data. Additionally, the subsequent application rotates the stroke, as represented by the movement data, about the beginning of the stroke to locate the end of the stroke at the position of the end of the stroke indicated by the position data.

In an embodiment, the movement data 216 and the position data 226 are provided to a character recognition engine (not shown) that operates on the movement data and the position data to assemble characters and to identify such characters. For each character, the handwriting recognition engine outputs a character code, such as an ASCII code, that can be used by a host (or processor) to store, display and/or otherwise process the character represented by the code. The character recognition engine may be located within the pen input device 10 or may be external to the pen input device.

Figure 4:
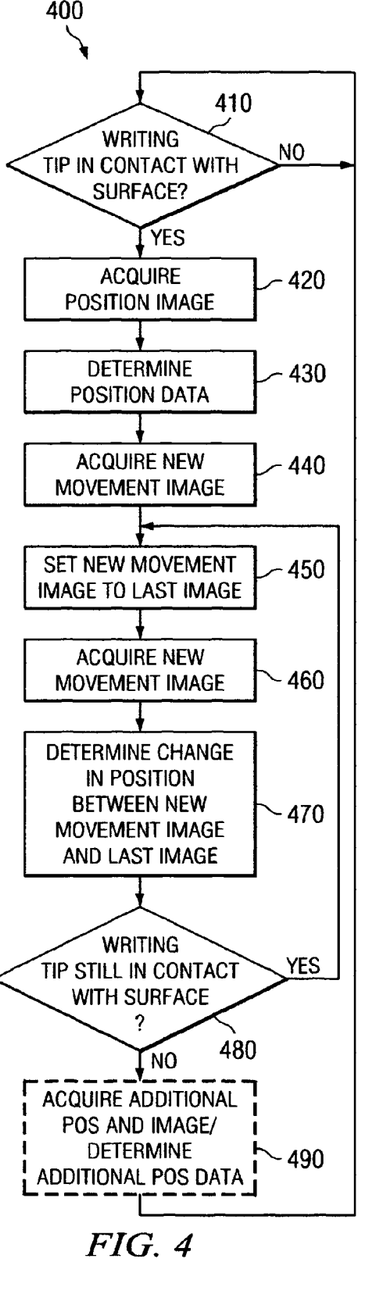
FIG. 4 is a flow chart illustrating an exemplary process for determining the position of a pen input device on a surface, in accordance with one embodiment of the present invention.

FIG. 4 shows a flow chart illustrating an exemplary process 400 for capturing the motion of the writing tip of a pen input device using a position detection system and a movement detection system. In block 410, a determination is made of whether the writing tip is in contact with a writing surface. A "yes" result in block 410 indicates the beginning of a writing operation. When a "yes" result is produced in block 410, a position image of the surface is acquired at block 420 and the position of the writing tip on the writing surface at the beginning of the writing operation is determined in block 430. A "no" result in block 410 results in block 410 being repeated.

In block 440, a movement image is acquired and is designated as a last movement image in block 450. A new movement image is acquired in block 460. In block 470, the change in the position of the writing tip between the last movement image and the new movement image is determined as movement data. The movement data quantifies the magnitude and direction ($\Delta x$, $\Delta y$; or $\Delta r$, $\Delta \theta$) of the change in the position of the writing tip between last movement image and the new movement image. In block 480, another test is performed to determine whether the writing tip is still in contact with the writing surface. When the result in block 480 is "yes," indicating that the writing tip is still in contact with the writing surface, execution returns to block 450 where the new movement image that was acquired in block 460 is designated as the last movement image, and another new movement image is acquired in block 460. When the result in block 480 is "no," indicating that the user has moved the writing tip out of contact with the writing surface, execution returns to block 410 via optional block 490. In block 490, an additional position image is captured and additional position data indicating the position of the writing tip on the writing surface at the end of the writing operation is derived from the additional position image. The method waits at block 410 until for user again to move the writing tip into contact with the writing surface.

In other embodiments, block 420, in which the position image is acquired, and block 430, in which the position data is determined, are performed after a number of movement images have been captured in blocks 440-470. In this case, the position of the writing tip on the writing surface is determined after the beginning of the writing operation. In yet other embodiments, above-mentioned blocks 420 and 430 are each performed twice at arbitrary but spatially-separated points on the stroke. Each set of position data is linked to the movement data for the stroke.

Figure 5:
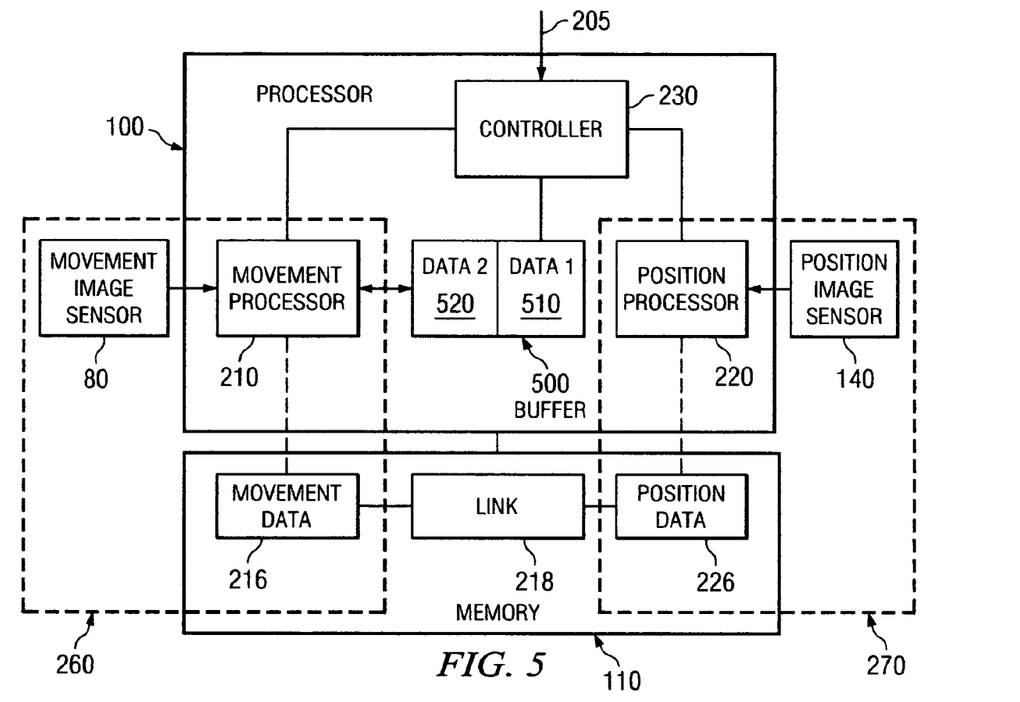
FIG. 5 is a block diagram illustrating exemplary hardware and processing components of the pen input device, in accordance with another embodiment of the present invention.

FIG. 5 schematically shows another exemplary embodiment of the pen input device in accordance with the invention. In the embodiment described above with reference to FIG. 3, the position detection system 170 uses two orthogonal edges of the writing surface 30 as a reference with respect to which it determines the position of the writing tip 20 on the writing surface. Under certain circumstances, the position detection system may fail to make a reliable position determination. For example, there may be insufficient contrast between the edges of the writing surface and the surface on which the writing surface is located for the edges of the writing surface to act as a positional references. This may occur, for example, when the writing surface 30 is white and is located on a light-colored surface. Although, this problem can be solved simply by placing the writing surface on a contrasting surface, such a contrasting surface may not always be available.

To solve this problem in a way that does not involve placing the writing surface 30 on a contrasting surface, in accordance with another embodiment of the present invention, and as shown in FIG. 5, the controller 230 delays activation of the position detection system 270, composed of position image sensor 140 and the position processor 220, until the user has completed one or more writing operations. For example, when the proximity signal 205 goes high, indicating that the user has moved the writing tip into contact with the writing surface, the controller 230 activates the movement detection system 260 to obtain movement data 510 for a first writing operation and to obtain movement data 520 for a second writing operation. The movement data 510 and 520 is temporarily stored in a buffer 500. Once the controller 230 determines that the movement data 510 and 520 from the two writing operations are stored in the buffer 500, the controller 230 activates the position detection system 270 to perform an operation in which a position image is acquired and converted to position image data and position data 226 is obtained using the marks made on the writing surface during the writing operations as positional references.

The position image data generated by the position detection system 270 includes position image data that represents the marks made by the writing tip 20 on the writing surface 30 in the two writing operations. The processor 100 uses the movement data 510 and 520 to identify the portion of the position image data that represents the marks, and additionally selects three, spatially-separated points on the marks to act as positional references. The processor 100 additionally constructs a positional coordinate system, such as a Cartesian coordinate system, using the three points as positional references. Finally, the processor uses the position data to define the positions of the marks represented by the movement data 510 and 520 in terms of the coordinate system to provide position data 226 for each of the marks. The processor transfers the movement data 510 and 520 from the buffer 500 to the memory 110 for storage therein as the movement data 216. In addition, the controller 230 provides a link 218 to link the position data 226 with the movement data 216.

Figure 6A:
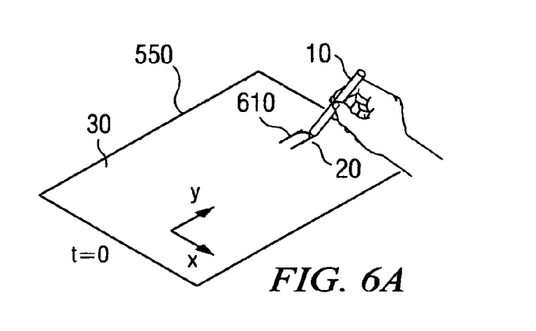
FIGS. 6A and 6B illustrate exemplary writing operations of the pen input device of the present invention.
Figure 6B:
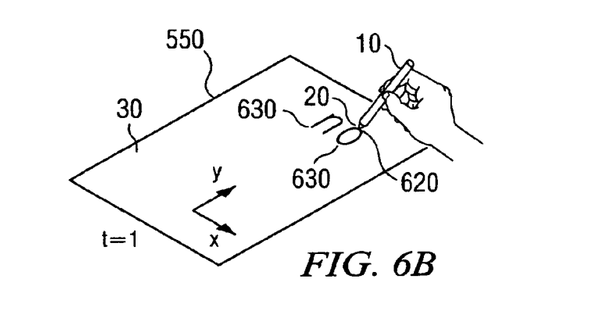

As an example, FIGS. 6A and 6B illustrate exemplary writing operations performed by the pen input device 10 in accordance with the invention. The pen input device 10 performs a first writing operation 610 on the writing surface 30. In the example shown, the first writing operation writes the letter "n." The movement data 510 generated by the pen input device 10 during the first writing operation and temporarily stored in the buffer 500 (FIG. 5) represents changes between successive positions of the writing tip 20 on the writing surface 30 during the first writing operation.

Subsequently, the pen input device 10 performs a second writing operation 620 on the writing surface 30. In the example shown, the second writing operation writes the letter "o." The movement data 520 generated by the pen input device 10 during the second writing operation and temporarily stored in the buffer 500 (FIG. 5) represents the changes between successive positions of the writing tip 20 on the writing surface 30 during the second writing operation.

After the two writing operations are completed, position data is generated using marks written on the writing surface 30 by the two writing operations as positional references 630. The positional references enable the position detection system 270 to determine the position of the pen input device 10 on the writing surface 30.

Since the coordinate system established in response to the marks written by the first and second writing operations has axes that are not necessarily parallel to the direction in which writing is performed on the writing surface, the processor may later, after one or more lines of writing have been written, perform an operation similar to that described to realign the coordinate system so that one of the axes thereof is parallel to the direction of writing. Realigning the coordinate system simplifies and rationalizes the position determination process. After the coordinate system has been realigned, the existing position data is transformed to the new coordinate system.

Figure 7:
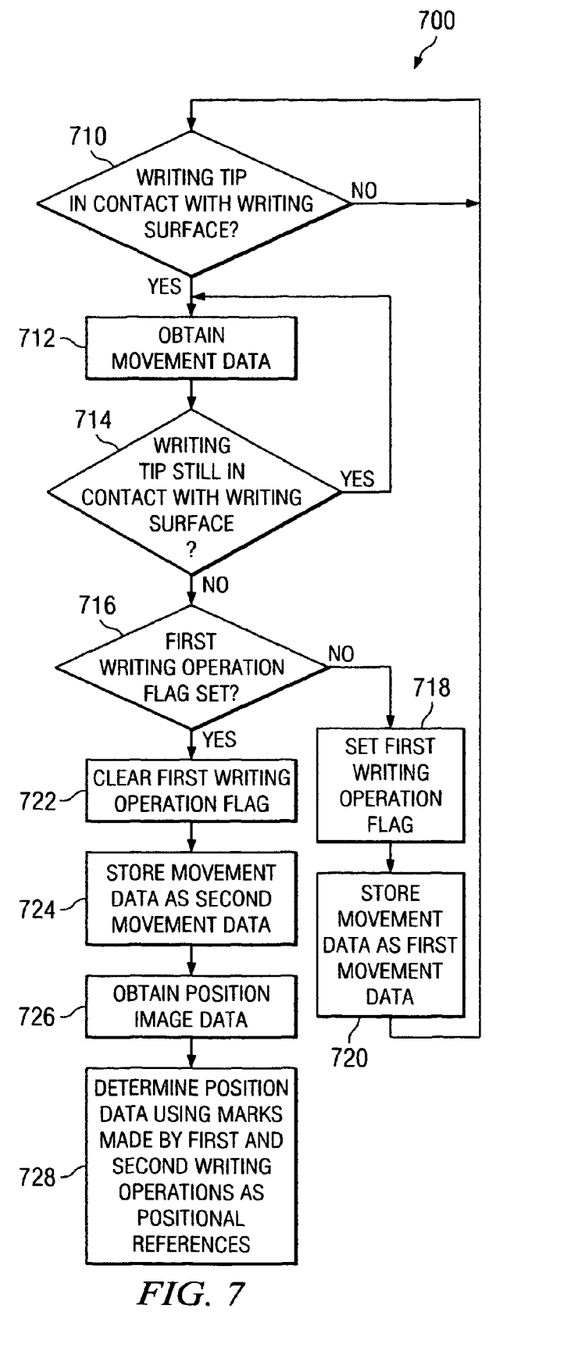
FIG. 7 is a flow chart illustrating another exemplary process for determining the position of a pen input device on a surface, in accordance with another embodiment of the present invention.

FIG. 7 is a flow chart illustrating another exemplary process 700 for determining the position of a pen input device using both position and movement data. Initially, at block 710, a determination is made of whether the writing tip of the pen input device is in contact with the writing surface. A "no" result indicates that no writing operation is in process and execution loops back to block 710.

A "yes" result in block 710 indicates the beginning of a writing operation and execution advances to block 712. In block 712, movement data representing the change between two successive positions of the writing tip on the writing surface is obtained. For example, the movement data may be obtained as described above with reference to FIG. 4. In block 714, a test is performed to determine whether the writing tip is still in contact with the writing surface. A "yes" result in block 714 loops execution back to block 712 to obtain additional movement data. A "no" result in block 714 indicates that the writing operation has ended and execution advances to block 716.

In block 716, a test is performed to determine whether a first write operation flag has been set. A "no" result in block 716 indicates that the first write operation flag has not been set and that the write operation just completed is a first write operation. A "no" result in block 716 causes execution to advance to block 718, where the first write operation flag is set, and then to block 720, where the movement data is stored in the buffer 500 as first movement data 510 (FIG. 5). Execution then returns to block 710 to await the beginning of the second write operation.

A "yes" result is obtained in block 716 when the just-completed write operation is the second write operation. Execution advances to block 722, where the first write operation flag is cleared, and then to block 724, where the movement data is stored in the buffer 500 as second movement data 520 (FIG. 5).

Execution then advances to block 726, where position image data is obtained, and then to block 728, where position data is obtained using the marks made by the first and second writing operations as positional references. In block 728, the position image data and the stored movement data are used to establish a coordinate system for position detection using the marks made by the first and second writing operations as positional references. Then, position data for the first and second movement data is obtained from the position image data. The position data defines the positions of the marks made by the first and second writing operations in the coordinate system.

The position data for each subsequent writing operation defines the position of the corresponding stroke in the coordinate system.

As described above, the pen input device 10 in accordance with the invention includes a proximity sensor that generates a proximity signal whose state indicates the state of contact of the writing tip with the writing surface. The proximity signal is used to indicate the state of contact to the controller 230 (FIG. 3).

In accordance with the invention, the proximity signal is additionally linked to a clock counter in a manner that causes the clock counter to generate a time stamp each time the proximity signal changes state. The time stamps generated at the beginning and end of each writing operation are linked to the movement data for the writing operation for use in character recognition. When such time stamps are available, the character recognition program that receives the data generated by pen input device 10 uses the time stamps to determine, for each writing operation, the time during which the writing tip is in contact with the writing surface and the time that elapses between the writing operation and the next writing operation. These times differ among characters but are typically consistent for a given writer. Consequently, the character recognition program can learn the characteristic times for the different characters written by a given writer.

In languages such as Chinese and Japanese, the order in which the strokes are written to form a given character is prescribed and the prescribed order is almost invariably followed by writers. The rhythm with which the writer writes the strokes to form the different characters, as defined by the time stamps, gives the character recognition program additional data that it can use to increase its recognition accuracy.

The innovative concepts described in the present application can be modified and varied over a wide range of applications. Accordingly, the scope of patented subject matter should not be limited to any of the specific exemplary teachings discussed, but is instead defined by the following claims.

We claim:

1. A pen input device, comprising:
   a writing tip capable of performing a writing operation in contact with a writing surface;
   a movement detection system operable to generate movement data representing changes between successive positions of said writing tip on said writing surface, said movement detection system including a first optical image sensor for capturing successive movement images in response to light returned from said writing surface and for producing movement image data representing said successive movement images and a movement detection engine configured to produce movement data using said movement image data derived from said successive movement images captured using said first optical image sensor;
   a position detection system operable to determine a position of said writing tip on said writing surface, said position detection system including a second optical image sensor for capturing a position image in response to light returned from said writing surface and for producing position image data representing said position image and a position detection engine configured to produce position data using said position image data derived from said position image captured using said second optical image sensor, said position detection system being configured to determine said position data representing said position of said writing tip on said writing surface using marks made on said writing surface by at least two writing operations as a positional reference, wherein each of said two writing operations includes said writing tip being in contact with said writing surface followed by said writing tip not being in contact with said writing surface; and
   a controller operable to activate said movement detection system continuously during said writing operation and to activate said position detection system intermittently during said writing operation.

2. The pen input device of claim 1, wherein said movement detection system comprises:
   transfer optics for transferring said light returned by said writing surface to said first optical image sensor.

3. The pen input device of claim 2, wherein said position detection system comprises:
   image transfer optics for transferring said light returned from said writing surface to said second optical image sensor.

4. The pen input device of claim 3, further comprising a processor operable to process said movement image data and said position image data to produce said movement data and position data, respectively, said position data representing said position of said writing tip.

5. The pen input device of claim 4, wherein said processor comprises a movement detection engine operable to derive said movement data from said movement image data.

6. The pen input device of claim 4, wherein said processor comprises a position detection engine operable to determine said position data from said position image data.

7. The pen input device of claim 1, wherein said controller is operable to activate said position detection system at the beginning of said writing operation.

8. The pen input device of claim 7, wherein said controller is operable to activate said position detection system additionally at the end of said writing operation.

9. The pen input device of claim 8, further comprising a buffer operable to store said movement data during said at least two writing operations.

10. The pen input device of claim 1, wherein said controller is operable to activate said position detection system to determine no more than two positions of said writing tip during said writing operation.

11. The pen input device of claim 1, wherein said controller is operable to activate said position detection system at spatially-separated positions of said writing tip during said writing operation.

12. The pen input device of claim 1, wherein said controller further provides a link to associate said movement data with said position data obtained during each writing operation performed by said pen input device.

13. The pen input device of claim 12, additionally comprising memory for storing said movement data, said position data and said link.

14. The pen input device of claim 1, wherein marks on said surface made by at least two writing operations function as a positional reference with respect to which said position detection system determines said position data.

15. The pen input device of claim 1, further comprising a proximity sensor operable to provide to said controller a proximity signal indicating a state of contact of said writing tip with said writing surface.

16. A method for capturing the position of the writing tip of a pen input device on a writing surface during a writing operation, the method comprising:
   determining movement data while the writing tip contacts the writing surface during the writing operation, said movement data representing changes between successive positions of said writing tip on said writing surface, said determining said movement data comprises acquiring successive movement images using a first optical image sensor, producing movement image data representing said successive movement images, and determining said movement data from said movement image data using a movement detection engine that produces said movement data using said movement image data derived from said successive movement images captured using said first optical image sensor;
   determining position data at least once during said writing operation as part of a position detecting operation that is activated intermittently during said writing operation, said position data representing a position of said writing tip on said writing surface, said determining said position data comprises acquiring a position image using a second optical image sensor, producing position image data representing said position image, and determining said position data from said position image data using a position detection engine that produces said position data using said position image data derived from said position image captured using said second optical image sensor, said determining said position data includes using marks made on said writing surface by at least two writing operations as a positional reference, wherein each of said two writing operations includes said writing tip being in contact with said writing surface followed by said writing tip not being in contact with said writing surface; and linking said position data and said movement data.

17. The method of claim 16, wherein:

said determining said position data additionally comprises determining said position data after movement data for at least two writing operations has been determined; and marks made on said writing surface by said at least two writing operations function as a positional reference with respect to which said position data is determined.

18. The method of claim 16, wherein said determining said position data comprises determining said position data at the beginning of said writing operation.

19. The method of claim 18, additionally comprising determining additional position data at the end of said writing operation, said additional positional data representing a position of said writing tip at said end of said writing operation.

20. The method of claim 16, wherein:

the method additionally comprises determining additional position data during said writing operation; and said positional data and said additional positional data represent respective spatially-separated positions of said writing tip during said writing operation.

21. The method of claim 20, wherein:

said writing operation writes a stroke on said writing surface; and said method additionally comprises determining an orientation of said stroke relative to said writing surface using said position data and said additional position data.

22. The method of claim 16, additionally comprising:

detecting contact of said writing tip with said writing surface; and performing said determining said movement data and said determining said position data in response to said detecting said contact.

23. The method of claim 16, additionally comprising:

detecting timing of successive contacts of said writing tip with said writing surface; and performing character recognition at least in part in response to said timing of said successive contacts.

* * * * *